United States Patent
Pau (10) Patent No.: US 10,445,613 B2
(45) Date of Patent: Oct. 15, 2019

(54) METHOD, APPARATUS, AND COMPUTER READABLE DEVICE FOR ENCODING AND DECODING OF IMAGES USING PAIRS OF DESCRIPTORS AND ORIENTATION HISTOGRAMS REPRESENTING THEIR RESPECTIVE POINTS OF INTEREST

(71) Applicant: STMicroelectronics S.r.l., Agrate Brianza (IT)

(72) Inventor: Danilo Pietro Pau, Sesto San Giovanni (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1238 days.

(21) Appl. No.: 14/052,207

(22) Filed: Oct. 11, 2013

(65) Prior Publication Data
US 2014/0133550 A1    May 15, 2014

(30) Foreign Application Priority Data
Nov. 14, 2012  (IT) .............................. TO2012A0985

(51) Int. Cl.
*H04N 19/124* (2014.01)
*G06K 9/46* (2006.01)
(Continued)

(52) U.S. Cl.
CPC ........... *G06K 9/4671* (2013.01); *G06F 17/30* (2013.01); *G06K 9/46* (2013.01); *H04N 19/124* (2014.11);
(Continued)

(58) Field of Classification Search
None
See application file for complete search history.

(56) References Cited

U.S. PATENT DOCUMENTS 6,091,777 A *  7/2000  Guetz ................. H04N 19/172
                                            375/240.03
7,016,547 B1 *  3/2006  Smirnov ................ H03M 7/40
                                            375/E7.144
(Continued)

FOREIGN PATENT DOCUMENTS

EP          2317476 A2     5/2011

OTHER PUBLICATIONS

Lowe, "Distinctive Image Features from Scale-Invariant Keypoints," *International Journal of Computer Vision* 60(2):91-110, 2004.
(Continued)

*Primary Examiner* — William C Vaughn, Jr.
*Assistant Examiner* — Joseph Daniel A Towe
(74) *Attorney, Agent, or Firm* — Seed IP Law Group LLP (57) ABSTRACT

First and second video frames in a flow of digital video frames are encoded by extracting respective sets of keypoints and descriptors, each descriptor including a plurality of orientation histograms regarding a patch of pixels centered on the respective keypoint. Once a pair of linked descriptors has been identified, one for each frame, which have a minimum distance from among the distances between any one of the descriptors of the first frame and any one of the descriptors of the second frame, the differences of the histograms of the descriptors linked in the pair are calculated, and the descriptors linked in the pair are encoded as the set including one of the linked descriptors and the histogram differences by subjecting the histogram differences to a thesholding setting at zero all the differences below a certain threshold, to quantization, and to run-length encoding.

19 Claims, 11 Drawing Sheets

(51) Int. Cl.
*G06F 17/30* (2006.01)
*H04N 19/503* (2014.01)
*H04N 19/13* (2014.01)
*H04N 19/132* (2014.01)
*H04N 19/93* (2014.01)

(52) U.S. Cl.
CPC ........... *H04N 19/13* (2014.11); *H04N 19/132* (2014.11); *H04N 19/503* (2014.11); *H04N 19/93* (2014.11)

(56) References Cited

U.S. PATENT DOCUMENTS

| | | | | |
|---|---|---|---|---|
| 2005/0031025 | A1* | 2/2005 | Xie | H04L 1/0046 375/222 |
| 2012/0011119 | A1* | 1/2012 | Baheti | G06K 9/4676 707/737 |
| 2012/0011142 | A1* | 1/2012 | Baheti | G06K 9/4671 707/769 |
| 2012/0183224 | A1* | 7/2012 | Kirsch | G06K 9/4619 382/195 |
| 2013/0148903 | A1* | 6/2013 | van Zwol | G06K 9/6211 382/224 |
| 2013/0272583 | A1* | 10/2013 | Ahonen | G06K 9/00281 382/118 |
| 2014/0010407 | A1* | 1/2014 | Sinha | G06K 9/00664 382/103 |

OTHER PUBLICATIONS

Italian Search Report and Written Opinion dated Aug. 26, 2013 from corresponding Italian Application No. TO2012A000985.
Vijay Chandrasekhar et al: *Compressed Histogram of Gradients: A Low-Bitrate Descriptor*, International Journal of Computer Vision, Kluwer Academic Publishers, BO, vol. 96, No. 3, May 15, 2011 (May 15, 2011), pp. 384-399, XP035008617.
Danilo Pau et al: *CDVS Whitepaper: STM proposal*, 102. MPEG Meeting; Oct. 15, 2012-Oct. 19, 2012; Shanghai; (Motion Picture Expert Group or ISO/IEC JTC1/SC29/WG11),, No. m26509, Oct. 6, 2012 (Oct. 6, 2012), XP030054842.
Danilo Pau et al: *Technologies for Visual Search Scope Expansion*, 102. MPEG Meeting; Oct. 15, 2012-Oct. 19, 2012; Shanghai; (Motion Picture Expert Group or ISO/IEC JTC1/SC29/WG11),, No. m26659, Oct. 17, 2012 (Oct. 17, 2012), XP030054992.
Kuhl F P et al: *Global Shape Recognition of 3-D Objects Using a Differential Library Storage*, Computer Vision Graphics and Image Processing, Academic Press, Duluth, MA, US, vol. 27, No. 1, Jul. 1, 1984 (Jul. 1, 1984), pp. 97-114, XP002012880.
Anonymous: *Test Model 3: Compact Descriptors for Visual Search*, 101. MPEG Meeting; Jul. 16, 2012-Jul. 20, 2012; Stockholm; (Motion Picture Expert Group or ISO/IEC JTC1/SC29/WG11),, No. N12929, Aug. 16, 2012 (Aug. 16, 2012), XP030019401.

* cited by examiner

METHOD, APPARATUS, AND COMPUTER READABLE DEVICE FOR ENCODING AND DECODING OF IMAGES USING PAIRS OF DESCRIPTORS AND ORIENTATION HISTOGRAMS REPRESENTING THEIR RESPECTIVE POINTS OF INTEREST

CROSS REFERENCE TO RELATED APPLICATION

This application claims the priority benefit of Italian Patent Application No. TO2012A000985, filed Nov. 14, 2012, which is hereby incorporated by reference to the maximum extent allowable by law.

BACKGROUND

Technical Field

The present description relates to encoding/decoding of flows of digital video frames.

Various embodiments may be applied to the treatment of digital video signals.

Discussion of the Related Art

Documents such as the document ISO/IEC JTC1/SC29/WG11/W12929, July 2012, Stockholm, Sweden, Test Model 3: Compact Descriptors For Visual Search describe processing techniques (for example, with pipeline architecture) based upon the use of compact descriptors that can be used for functions of matching and retrieval of images.

SUMMARY

Various embodiments are aimed at extending the field of application of said techniques, in particular to encoding/decoding of digital video signals that contain objects and or scenes moving with respect to the observer or the filming camera.

According to an embodiment, there is provided a method of encoding a first and a second video frame in a flow of digital video frames, the method including: extracting for said first and second frame respective sets of points of interest and descriptors wherein each descriptor includes a plurality of orientation histograms relative to a patch of pixels centered on the respective point of interest, identifying a pair of linked descriptors, one for the first frame and the other for the second frame, having a minimum distance out of the distances of any of the descriptors for the first frame and any of the descriptors for the second frame, calculating the differences of the histograms of the descriptors linked in said pair, and encoding the descriptors linked in said pair as a set including one of the descriptors linked in said pair and said histogram differences, wherein said histogram differences are subjected, after thresholding by setting to zero all the differences below a certain threshold, to quantization and to run-length encoding.

According to an embodiment, the run-length encoding is followed by further encoding selected out of Huffman coding, arithmetic coding and type encoding.

According to an embodiment, the method includes, prior to calculating said histogram differences, projecting to a common coordinate system the histograms of the descriptors linked in said pair.

According to an embodiment, the method includes identifying, in addition to said pair of linked descriptors having a minimum distance out of the distances of any of the descriptors for the first frame and any of the descriptors for the second frame, a second pair of linked descriptors having a distance which differs from said minimum distance by less than a threshold difference, and encoding both said pair of linked descriptors and said second pair as an encoded pair.

According to an embodiment, there is provided a method of decoding a first and a second video frame encoded that further includes recovering said histogram differences subjected to quantization and run-length coding, subjecting said recovered histogram differences to inverse run-length coding to produce two-component entities including a number equal to RUN followed or preceded by number of zeros equal to LENGTH, subjecting said two-component entities to inverse quantization, generating, from said one of the descriptors linked in said pair and said two-component entities subjected to inverse quantization, a replica of the other of the descriptors linked in said pair.

According to an embodiment, the method includes recovering said run-length encoded differences includes a decoding operation selected out of Huffman decoding, arithmetic decoding and type decoding.

According to an embodiment, there is provided an encoder for encoding a flow of digital video frames, the encoder configured for implementing the method of encoding.

According to an embodiment, there is provided a decoder for decoding a flow of digital video frames encoded with the method of encoding.

According to an embodiment, there is provided a computer program product, loadable into the memory of at least one computer and including software code portions for performing the method of encoding.

According to an embodiment, there is provided a computer program product, loadable into the memory of at least one computer and including software code portions for performing the method of decoding.

Various embodiments may refer to corresponding encoding/decoding systems, as well as to computer program products that can be loaded into the memory of at least one computer and comprise parts of software code that are able to execute the steps of the aforesaid methods when the product is run on at least one computer. As used herein, reference to such a computer program product is understood as being equivalent to reference to a computer-readable means containing instructions for controlling the processing system in order to co-ordinate implementation of the method according to the invention. Reference to "at least one computer" is intended to highlight that the embodiments may be implemented in modular and/or distributed form on a number of processing units.

The claims form an integral part of the technical teaching provided herein in relation to the invention.

BRIEF DESCRIPTION OF THE DRAWINGS

Various embodiments will now be described, purely by way of non-limiting example, with reference to the annexed figures, wherein.

DETAILED DESCRIPTION

In the ensuing description various specific details are illustrated, aimed at providing an in-depth understanding of various examples of embodiments. The embodiments may be obtained without one or more of the specific details, or with other methods, components, materials, etc. In other cases, known structures, materials, or operations are not illustrated or described in detail so that the various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in various points of the present description do not necessarily refer to one and the same embodiment. Moreover, particular conformations, structures, or characteristics may be combined in any adequate way in one or more embodiments.

The references used herein are provided merely for the convenience of the reader and hence do not define the sphere of protection or the scope of the embodiments.

Figure 1:
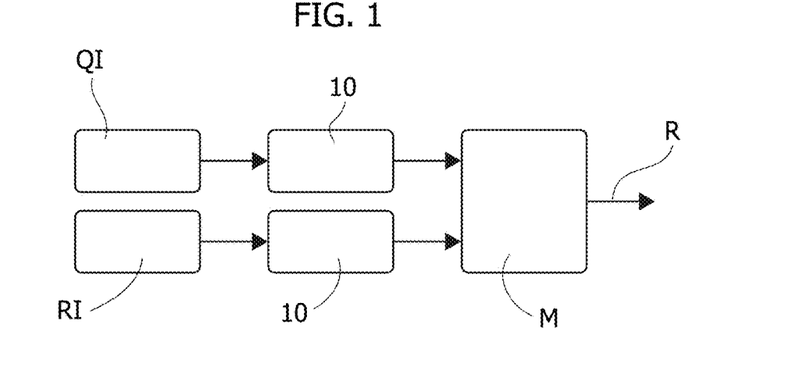
FIGS. 1 and 2 are functional block diagrams that illustrate possible functions of treatment of images based upon extraction of features.
Figure 2:
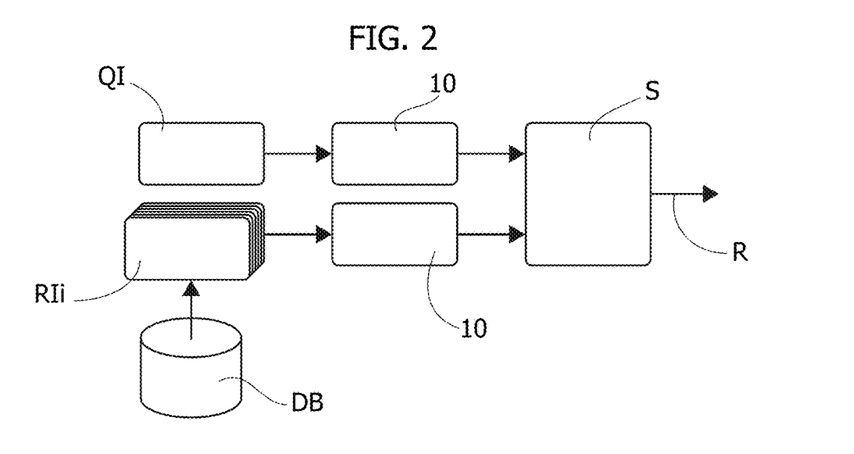
Figure 3:
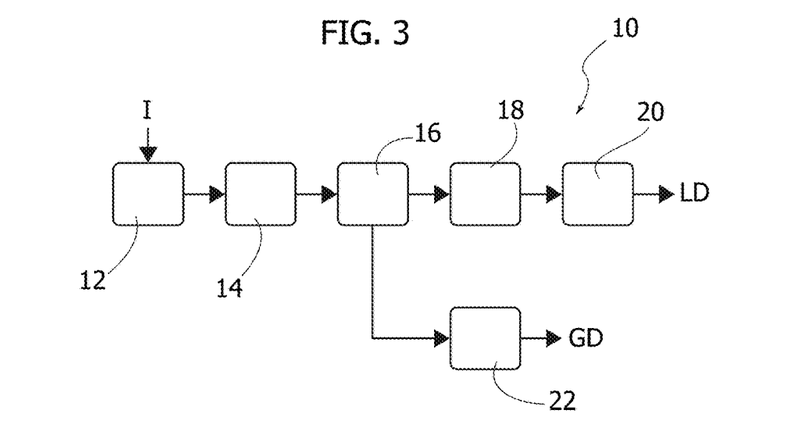
FIG. 3 is a functional block diagram that illustrates possible modalities of extraction of features.

FIGS. 1 to 3 are drawn from the document ISO/IEC JTC1/SC29/WG11/W12929, already referred to previously, and in particular from Section 1, Introduction, and from Section 2, Compact Descriptor Extraction, of the document in question, which, at the subsequent Section 5, Software Architecture and Implementation Details, illustrates examples of embodiment of an architecture for selection of the most significant features to be compressed in each digital video frame considered.

In particular, FIGS. 1 and 2 illustrate at the level of block diagram examples of functional architectures that can be used for performing a function of calculation of matching M or of search or retrieval S of digital video frames, i.e., images.

In the first case (action of matching M of FIG. 1), this may take place in an automated way (for example, via a computer) if two images illustrate the same objects or the same scene. This occurs by operating on a query image QI and on a reference image RI.

For this purpose, both of the images can be subjected to an operation of extraction of descriptors (designated as a whole by 10) and to an operation of comparison conducted in M by operating precisely on the descriptors and the features in 10 and aimed at detecting the possible matching. The result of the processing, designated by R, indicates whether the query image QI illustrates or not the same objects or the same scene, i.e., matches the reference image RI.

The function of retrieval, to which FIG. 2 refers as a whole, operates fundamentally according to the same criteria, with the difference represented by the fact that, in the case of FIG. 2, the comparison in S is made with a number of reference images $RI_i$ extracted from a database DB. In this way, it is possible to search and retrieve, within the database DB, one or more images that reproduce the same objects or the same scene as the query image QI.

Various architectures and technologies of components that are able to execute the functions illustrated with reference to FIGS. 1 and 2 are defined in the so-called Test Model 3.0 (TM3) for Compact Descriptors for Visual Search (CDVS): the model TM3 implements the functions requested for extraction and comparison of compact descriptors limited to a set of predetermined descriptor lengths.

FIG. 3 illustrates a possible block diagram of a processing system (for example, structured as pipeline) for extraction of features from video frames.

In various embodiments, a compact descriptor of an image I (which, in more general terms, may be viewed in the form of digital video frames), may comprise, in addition to a certain number of local descriptors, also a single global descriptor that can represent the image as a whole.

The diagram of FIG. 3 illustrates an example of architecture that enables production of a compact descriptor of an image/frame according to the model TM3 through a sequence of processing steps.

In the diagram of FIG. 3, the reference 12 designates a function/module for identifying interest points or keypoints in an image based upon a multiscale representation that can be obtained, for example, with a Differences-of-Gaussians (DoG) technique.

In the diagram provided by way of example of FIG. 3, the DoG function/module 12 is followed by a function/module 14 in which the so-called feature points are described, for example, with a scale-invariant feature transform (SIFT).

In the diagram provided by way of example in FIG. 3, the results of the action of transform obtained in 14 are fed to a function/module 16 for selecting the keypoints, which are to perform a function for selecting the features.

For example, in various embodiments, the function/module 16 can assign a positive value to each feature as a function of its DoG characteristics, of the corresponding SIFT vector, and of its co-ordinates.

For example, in the case where the n-th feature of an image is designated by $s_n$ (with a connotation that incorporates the DoG characteristics, the SIFT vector, and the corresponding co-ordinates), it is possible to designate by r a quantity indicating the keypoint relevance; in this way, to a given feature it is possible to associate a value $r(s_n)$, and the aforesaid relevance values can be ordered in a decreasing scale, in such a way that, for example, only the first L features $n_1, \ldots, n_L$ are kept so as to be able to maintain the average length of the sequence within a certain length limit.

The result of the processing operation performed in 16 (i.e., selection of a limited number of keypoints that is able to maximize a measurement of the expected quality as a function of the use envisaged—for example, for actions of matching or search, as exemplified in FIGS. 1 and 2) may be subjected within a function/module 18 to a compression of the local descriptors, i.e., a scalar or vector quantization of the features selected in 16.

The result of the processing operation performed in 18 is then transmitted to a function/module 20 for compressing the co-ordinates, which compresses the co-ordinates of the keypoints selected so as to generate the local descriptors LD at output.

The result of the processing operation performed in 16 can then be sent also to a function/module 22 that performs a function of aggregation of the SIFT features so as to form a global descriptor GD.

Possible criteria of implementation of the diagram exemplified in FIG. 3 are described in detail in the document ISO/IEC JTC1/SC29/WG11/W12929, already repeatedly cited, also in the light of the article by D. G. Lowe: "Distinctive Image Features from Scale-Invariant Keypoints", International Journal of Computer Vision, 60, 91-110 (2004). For reasons of brevity, the corresponding detailed description is hence not repeated herein, also because in itself it is not essential for the purposes of an understanding of the embodiments.

With reference to what has been mentioned previously in regard to FIGS. 1 to 3 (and to the detailed illustration provided in the documents ISO/IEC JTC1/SC29/WG11/W12929 and Lowe referred to previously), extraction of the descriptors implemented in the architecture described by way of example with reference to FIG. 3 may be reduced to a generation of respective sequences (e.g., the sequences used in M and S to compare the query images QI with the reference images RI and RIi) comprising a set of pairs [$KP_{1i}$, $D_{1i}$], [$KP_{2i}$, $D_{2i}$], . . . , [$KP_{mi}$, $D_{mi}$], in which associated to the keypoints $KP_{1i}$, $KP_{2i}$, . . . , $KP_{mi}$ are the corresponding descriptors $D_{1i}$, $D2_i$, . . . , $D_{mi}$.

Such a sequence can be compressed to a limited number of bits limiting the number of the pairs comprised in the sequence. For example, the number m of the pairs may be limited to a threshold value $T_i$ for each frame, i.e., m=1, . . . , $T_i$ for the frame $F_i$ with the number of corresponding bits limited to a value num_bits$_i$, with the threshold $T_i$ that identifies in practice the number of keypoint/descriptor pair whereby, once this has been reached, each further pair, even though relevant, would not contribute to generating bits in a corresponding sequence or, alternatively, would be compressed to 0 bits.

Various embodiments are based upon the recognition of the fact that the techniques of extraction of the keypoints and of the descriptors, to which reference has been made previously, can be used for encoding/decoding digital video frames (i.e., images).

Figure 4:
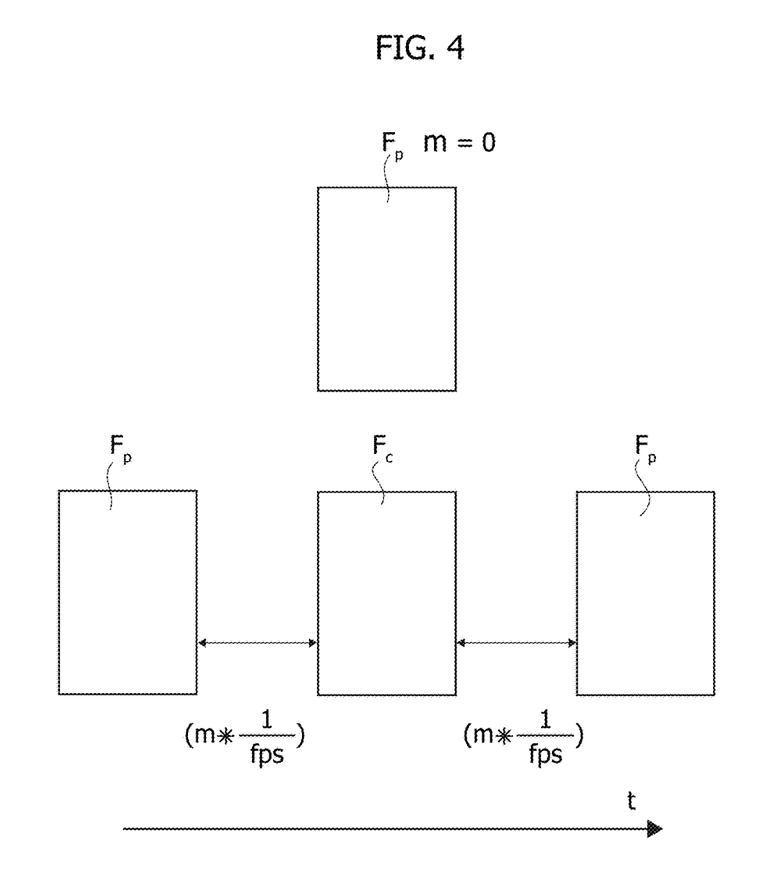
FIG. 4 is a block diagram generically illustrating a possible context of application of embodiments.

In FIG. 4, the reference $F_c$ designates a "current" digital video frame in a flow of video frames.

In the same figure, $F_p$ designates another frame that can, in general, present a distance m/fps from $F_c$, where fps is the number of frames per second in the video flow.

The representation of FIG. 4 highlights the fact that m can be an integer with sign (i.e., positive or negative), so that the frame $F_p$ can be either subsequent (i.e., "future") or previous (i.e., "past") with respect to $F_c$. Again, m can also assume the value 0, in which case the frames $F_c$ and $F_p$ may have been acquired by two spatially adjacent photographic cameras.

For each of the frames $F_c$, $F_p$ it is possible, by using the techniques already described previously with reference to FIGS. 1 to 3, to generate sequences of keypoints and of corresponding descriptors, which are obtained, for example, with the SIFT techniques referred to previously and can be expressed in general as:

[$KP_{1c}$, $D_{1c}$], [$KP_{2c}$, $D_{2c}$], . . . , [$KP_{ic}$, $D_{ic}$] with i=1, . . . , B for the frame $F_c$; and

[$KP_{1p}$, $D_{1p}$], [$KP_{2p}$, $D_{2p}$], . . . , [$KP_{ip}$, $D_{ip}$] with i=1, . . . , C for the frame $F_p$.

The aforesaid sequences of keypoints and descriptors may be generated, for example, by adopting the solutions described in the paper by H. Lowe already cited previously, in particular in Sections 3, 4, 5 and 6 thereof. For reasons of brevity, the corresponding description will not hence be repeated herein. Persons skilled in the sector will note, on the other hand, that similar sequences of keypoints and corresponding descriptors may be generated, in various embodiments, with other techniques, which are likewise known.

In this connection, it may be noted that each descriptor $D_i$ can be viewed as a vector comprising a number E of scalar elements. For example, in the case of SIFT techniques, this vector may comprise E=128 elements, each represented with a byte (8 bits). Each descriptor $D_i$ can then be viewed as comprising a set of histograms (for example, 16 histograms), each comprising a vector (for example, with eight components) in such a way that: $D_{ic}$=[$h_0$, . . . , $h_{15}$], with $h_j$=[$\theta_1$, . . . , $\theta_8$], with j=0, . . . , 15.

Figure 5:
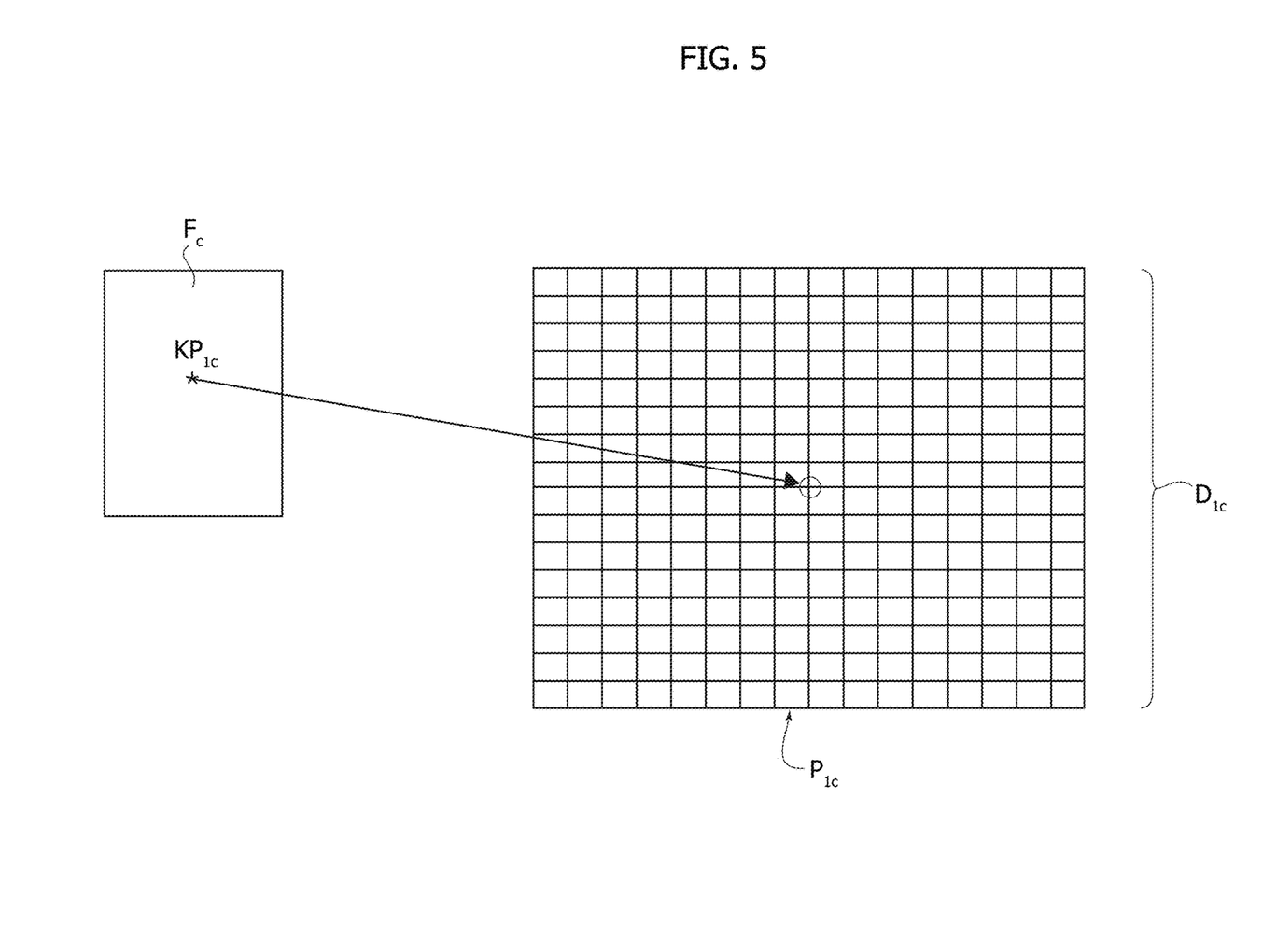
FIGS. 5 and 6, comprising three parts designated respectively by a), b) and c), as well as FIGS. 7 and 8, illustrate examples of processing operations according to embodiments.

With reference (for consistency, but without any limiting intent) to the definition of the SIFT descriptors exemplified in the article by Lowe already repeatedly cited, $h_j$ may be viewed as a vector of the orientations of the gradients in a so-called sub-patch of pixels, for example, of 4×4 pixels, which form jointly a patch of, for example, 16×16 pixels centred on the respective keypoint KP. A representation provided by way of example of what has been said herein is provided in FIG. 5.

In various embodiments, between the descriptors comprised in the sequences generated ("extracted") for the two frames $F_c$, $F_p$, it is possible to create a matching for pairs by calculating a distance (distance) for all the possible combinations of descriptors, for example, according to a relation of the type $$\text{distance}_{ic\text{-}jp} = \Sigma(D_{ick} - D_{jpk})^2$$

where the summation extends over the values of k from 1 to E.

The choice of the aforesaid "quadratic" distance is not on the other hand imperative. For example, in various embodiments, it is possible to use a definition of the aforesaid distance in the following terms:

$$\text{distance}_{ic\text{-}jp} = \Sigma |D_{ick} - D_{jpk}|$$

where once again the summation extends over the values of k from 1 to E.

In various embodiments, yet other choices of definitions of distance are possible, without any limitation to distances of a basically Euclidean type.

In various embodiments, the definition of distance, whatever choice is adopted, aims at establishing a spatial relation, with the intent of establishing a matching the least affected by error as possible, between any i-th descriptor of $F_c$ and any j-th descriptor of $F_p$.

The aim is to couple, that is to match or link the two pairs [$KP_{ic}$, $D_{ic}$] and [$KP_{jp}$, $D_{jp}$] (i.e., create a link between them) so that the distance is the minimum one as compared to all the distances that can be defined for any other pair [$KP_{ic}$, $D_{ic}$], [$KP_{mp}$, $D_{mp}$], with m≠j.

For completeness of treatment, it may be noted that, in various embodiments, there may exist at least one other pair (once again with m≠j) such as to present a very short distance (but for a threshold of arbitrary closeness) with respect to the case where m=j. In various embodiments, without any loss of generality, it is possible to encode both of the pairs thus identified [$KP_{ic}$, $D_{ic}$] and [$KP_{mp}$, $D_{mp}$] as two distinct pairs encoded on the basis of the criteria exemplified in what follows.

Figure 6:
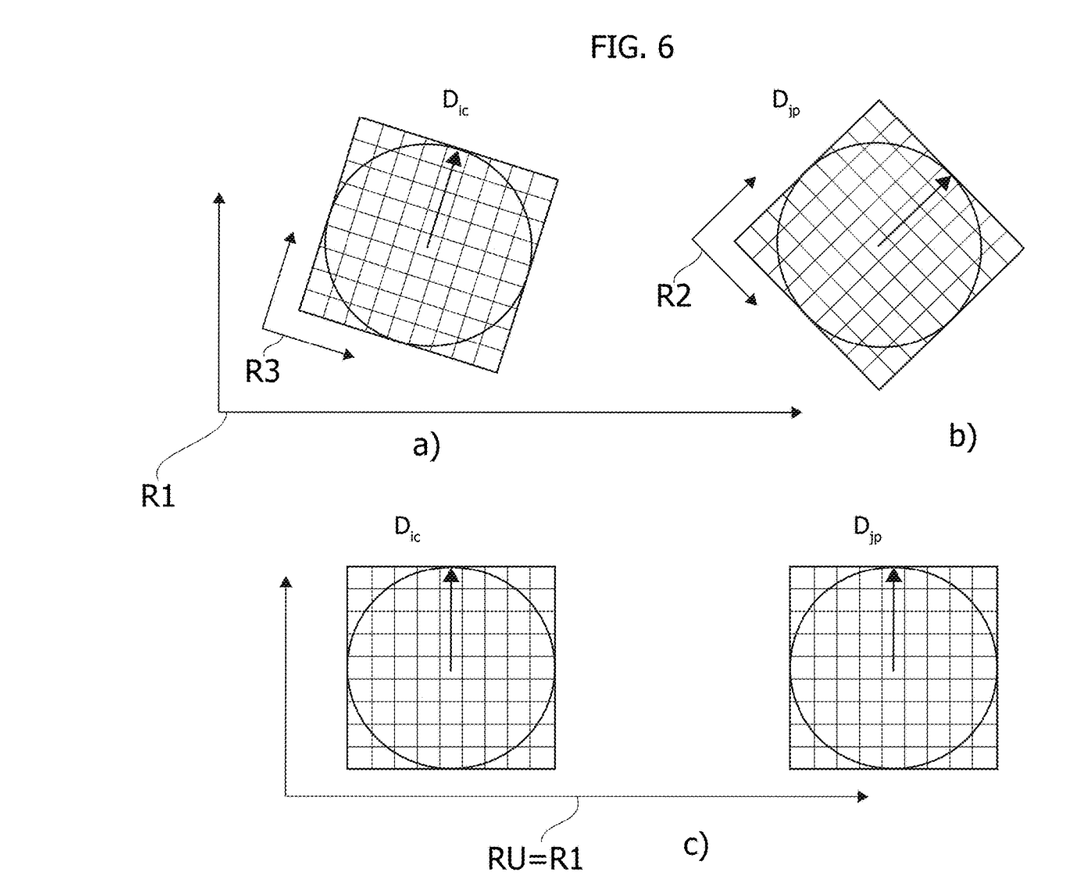

The representation of FIG. 6, comprising three parts designated respectively by a), b) and c), highlights the fact that the two descriptors $D_{ic}$, $D_{jp}$ can present respective main orientations, linked to the vector nature of the histogram, designated for example by R3 (for $D_{ic}$) and R2 (for $D_{jp}$) in the parts a) and b) of FIG. 6.

In various embodiments, prior to implementing the further processings, which will be described more fully in what follows, it is possible to proceed to a transformation (for example, a re-orientation) by transformation of the histograms to project them into a single reference system RU, which is common to both of the histograms and which, as exemplified in general terms in part c) of FIG. 6, can correspond to a reference R1 different from (for example, rotated with respect to) the references R2 and R3 that the histograms had initially.

Figure 7:
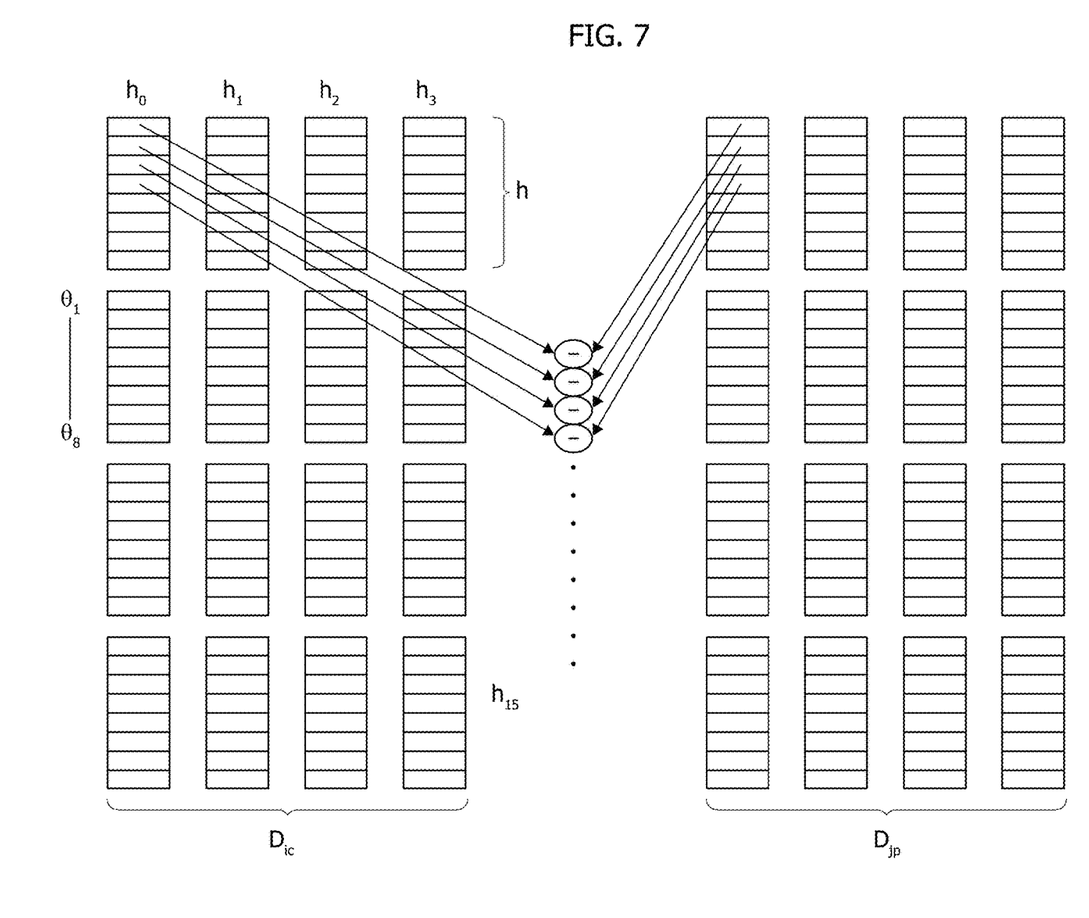

The representation of FIG. 7 illustrates an operation of calculation of the differences of the components of the histograms projected according to what has been said above, which present the same index within the vector, i.e., implemented by operating component by component.

On the basis of these differences found between the two descriptors it is thus possible to express one of the descriptors (e.g., the descriptor $D_{jp}$ or, respectively, the descriptor $D_{ic}$) as a function of the other (e.g., the descriptor $D_{ic}$ or, respectively, the descriptor $D_{jp}$).

In other words (with a terminology borrowed from the techniques of motion analysis and compensation commonly used, for example, in standards such as the MPEG standard), on the basis of the differences it is possible to "predict" one of the descriptors (henceforth the descriptor $D_{jp}$ will be taken as example) as a function of the other (i.e., in the example considered, the descriptor $D_{ic}$), substituting the representation of $D_{jp}$ with the histogram difference. This is possible in so far as $D_{jp}$ can be reconstructed starting from $D_{ic}$ and from the information regarding the difference between the histograms.

Figure 8:
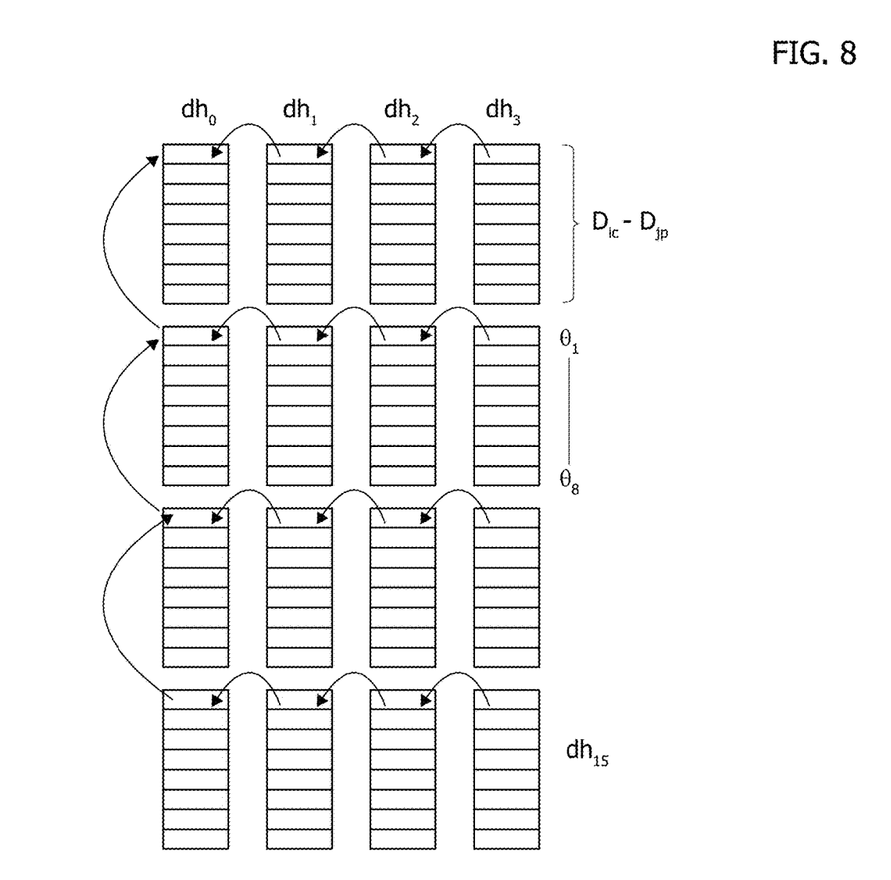

FIG. 8 highlights how, in various embodiments, it is possible to read the respective vector components starting from the differential vectors, following the paths designated by the arrows.

For example, it is possible to calculate the difference:

$$(\theta_1 \text{ of } dh_0 - \theta_1 \text{ of } dh_1)$$

or, in general terms, $$(\theta_j \text{ of } dh_{i+1} - \theta_j \text{ of } dh_i)$$

where, with reference to the dimensions cited previously in relation to the SIFT extraction techniques, $j=1, \ldots, 8$ and $i=0, \ldots, 14$.

In this way, for each component of orientation of a difference between the histograms it is possible to calculate a difference or prediction starting from the component read previously.

In various embodiments, said difference may be subjected to a function of thesholding in order to improve the efficiency of the subsequent action of compression.

In various embodiments, the aforesaid function of thresholding may be implemented, for example, by setting to zero all the values of a descriptor that fall below a threshold adopted for said thresholding operation.

The result of the aforesaid thresholding operation may be subjected to a scalar or else vector quantization, in one or more hierarchical stages, in view of a subsequent run-length encoding in the terms illustrated more fully in what follows.

Figure 9:
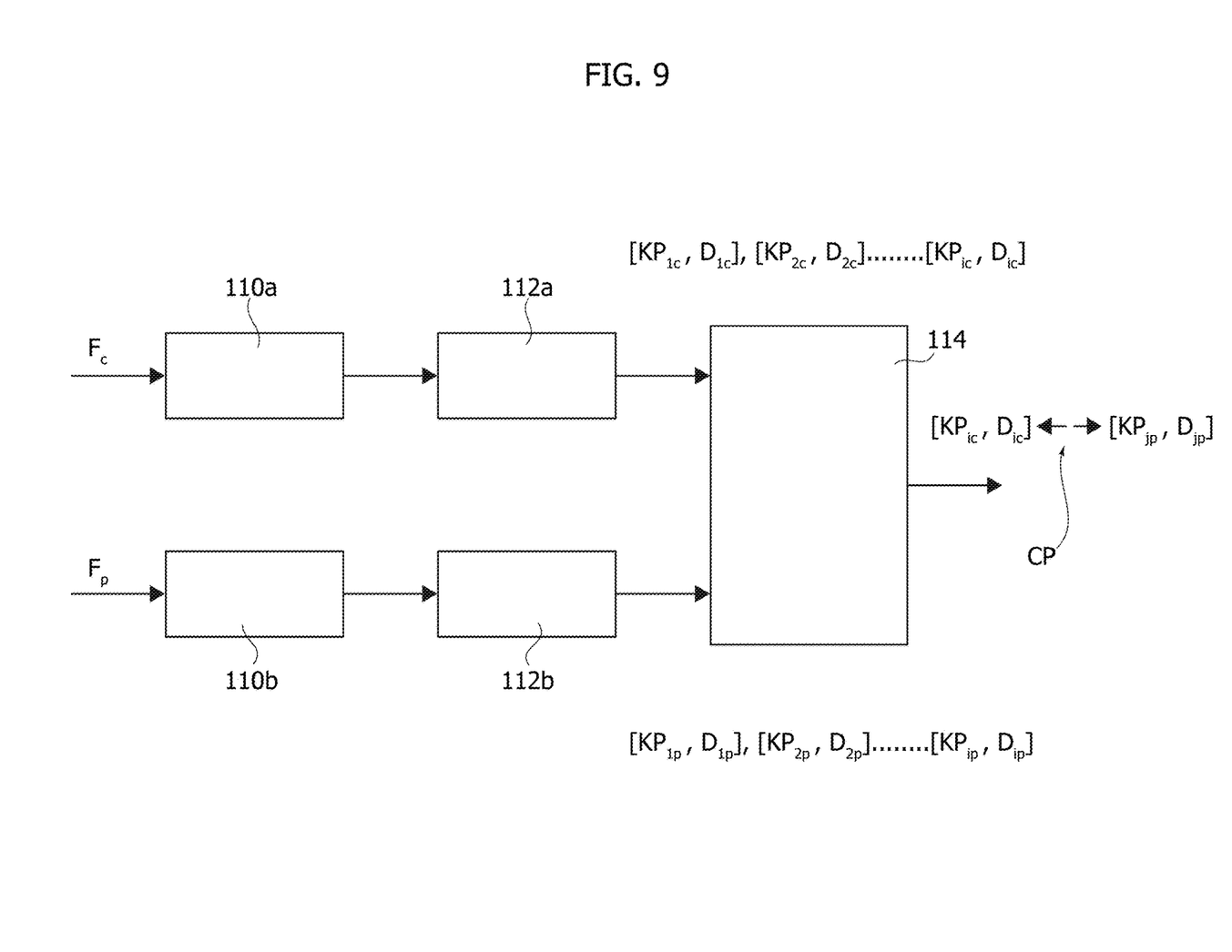
FIGS. 9 to 11 are block diagrams of an example of embodiment of an encoder.
Figure 10:
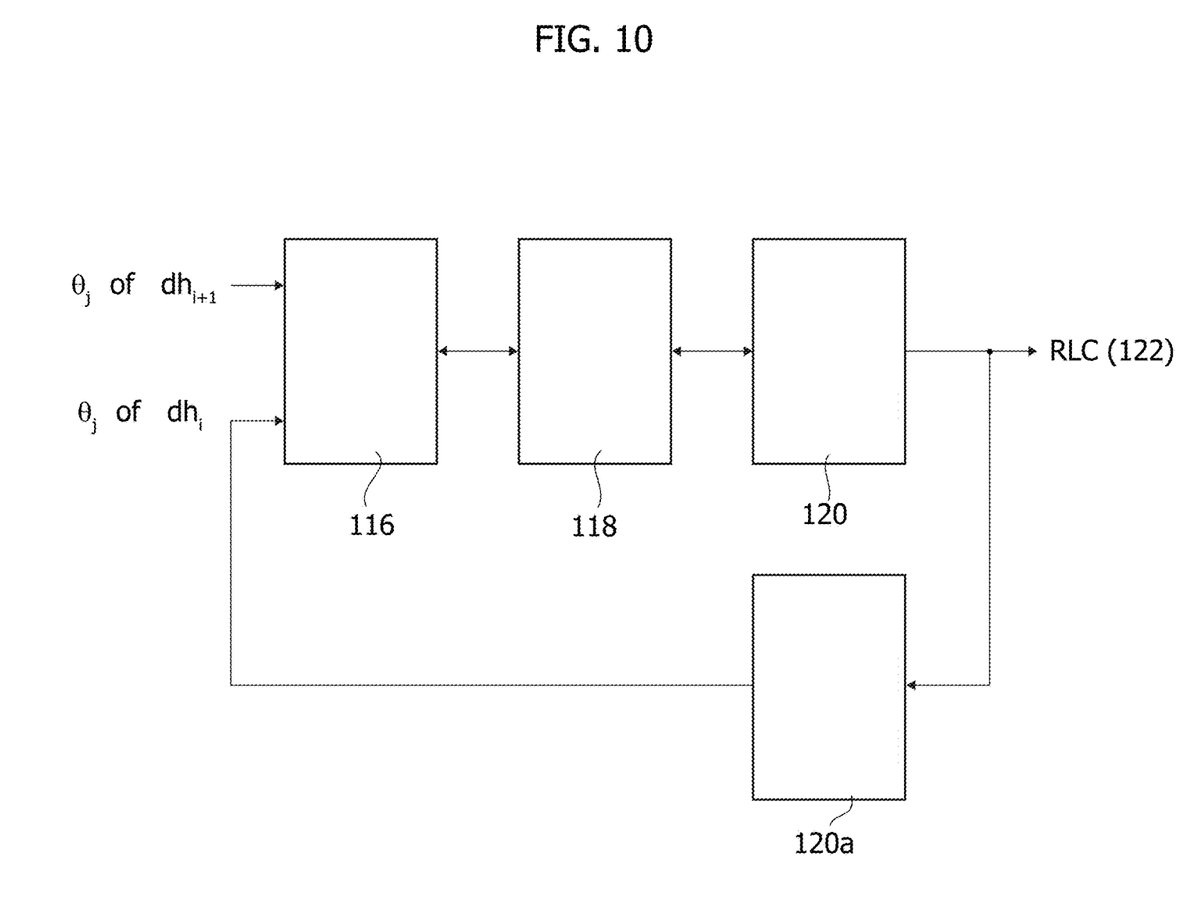

For immediate reference, the sequence of FIGS. 9 and 10 provides a representation by way of example of a set of processing modules (which may be implemented, for example, via a computer such as a processor, possibly at the software level, i.e., at the level of a computer program product) which can execute the processing operations described.

For example, the references 110a, 112a (regarding the frame $F_c$) and 110b, 112b (regarding the frame $F_p$) exemplify the operation of extraction of the keypoints and the generation of the corresponding descriptors, which may be conducted according to the criteria illustrated in the introductory part of the present description.

The reference 114 designates a processing module that performs the function of calculation of the distance of the descriptors, supplying at output the (at least one) pair CP of matched or linked, descriptors between which, in the module designated by 116 in FIG. 10, the action of calculation of the histogram differences exemplified in FIGS. 7 and 8 is performed.

The module 118 of FIG. 10 is dedicated to execution of the function of thesholding, and the reference 120 designates a module that may be used for execution of the quantization operation.

Said operation may be performed, according to known criteria, with the use of a reverse scalar (or vector) quantization module 120a, which is to supply at input to the module 116 the quantity $\theta_j$ of $dh_i$ used for calculating the difference with respect to the quantity $\theta_j$ of $dh_{i+1}$.

In various embodiments, the function of scalar quantization (here exemplified by the module 120) may aim at representing each individual value of the descriptor via a smaller number of bits.

In various embodiments, the function of vector quantization (once again exemplified by the module 120) may aim at representing sets of values of the descriptor via a code of fixed length, an address of one or more dictionaries, of various dimensions. In various embodiments (for example, as a result of execution of an operation of normalization not explicitly recalled in the drawings), the descriptor may present in the form of a normalized vector and hence present all its values comprised between 0 and 1. In various embodiments, it is possible to quantize each value with a fixed number of bits. For example, assuming that b is a number of bits used for each value and p represents the i-th value of the original descriptor, it is possible to calculate a corresponding value q of compressed descriptor by using an equation, in the case of scalar quantization, of the type $$q_i = [(2^b - 1) \cdot p_i + 1/2]$$

which, in a dual way, enables an original version of p, denoted as $p_i'$, to be obtained with a relation of the type $$p_i' = 1/(2^b - 1) \cdot q_i$$

The operation of quantization generates at output from the quantizer 120 sequences of non-zero values, amongst which there may be present sequences or bursts of one or more values equal to 0.

Such a signal is suited to a run-length encoding (which can be implemented in a module 122 visible in FIG. 11) in which, according to known criteria, there may be noted the number of values equal to 0 comprised between two values different from 0, and this value corresponding to the number of subsequent zeros is used as "LENGTH", whereas "RUN" is the value of one of the two non-zero values set at the end of the sequence of zeros. Said method can be repeated until no more non-zero values are found.

Figure 11:
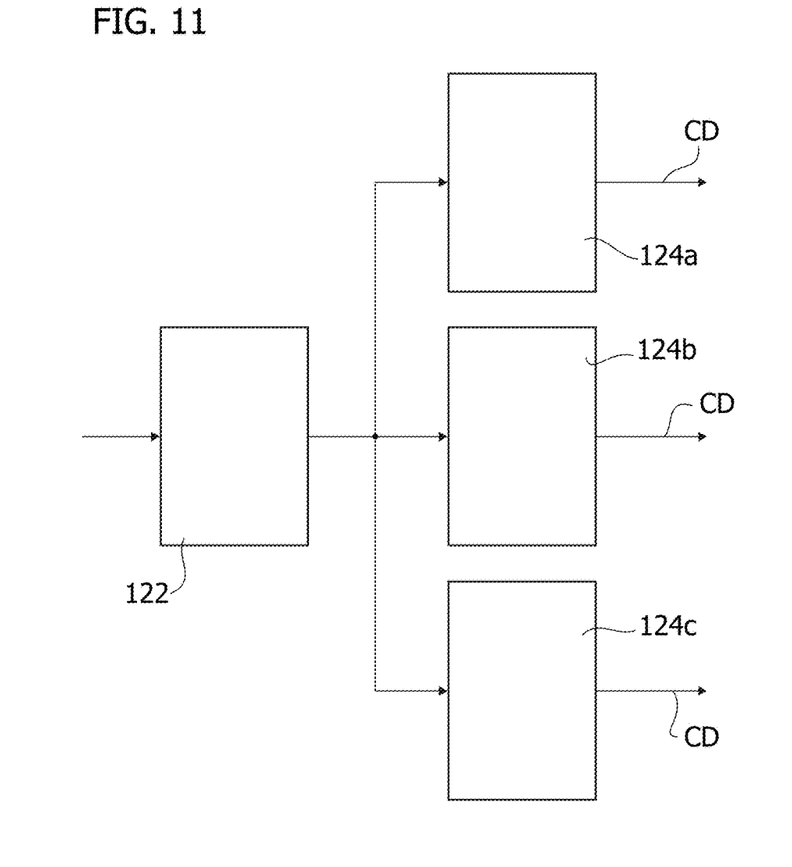

In various embodiments, the signal subjected to run-length encoding in the module 122 may be subjected to a further encoding aimed at generating complex descriptors CD.

The representation of FIG. 11 illustrates, purely by way of example, the possibility of adopting, in different embodiments, various encoding techniques 124a, 124b and 124c.

The fact that the blocks or modules 124a, 124b and 124c are represented as ideally located in parallel at output from the run-length encoding module 122 should not on the other hand be interpreted in the sense of a necessary and imperative simultaneous presence of a number of encoding modules 124a, 124b and 124c.

In various embodiments, just one of the modules 124a, 124b and 124c may be present, the choice being dictated at the design level by the applications envisaged.

Various embodiments may envisage the presence of two or more modules chosen from among the modules 124a, 124b and 124c, with the consequent possibility of choosing one or other of the modules in question according to the specific application at the moment implemented.

Figure 12:
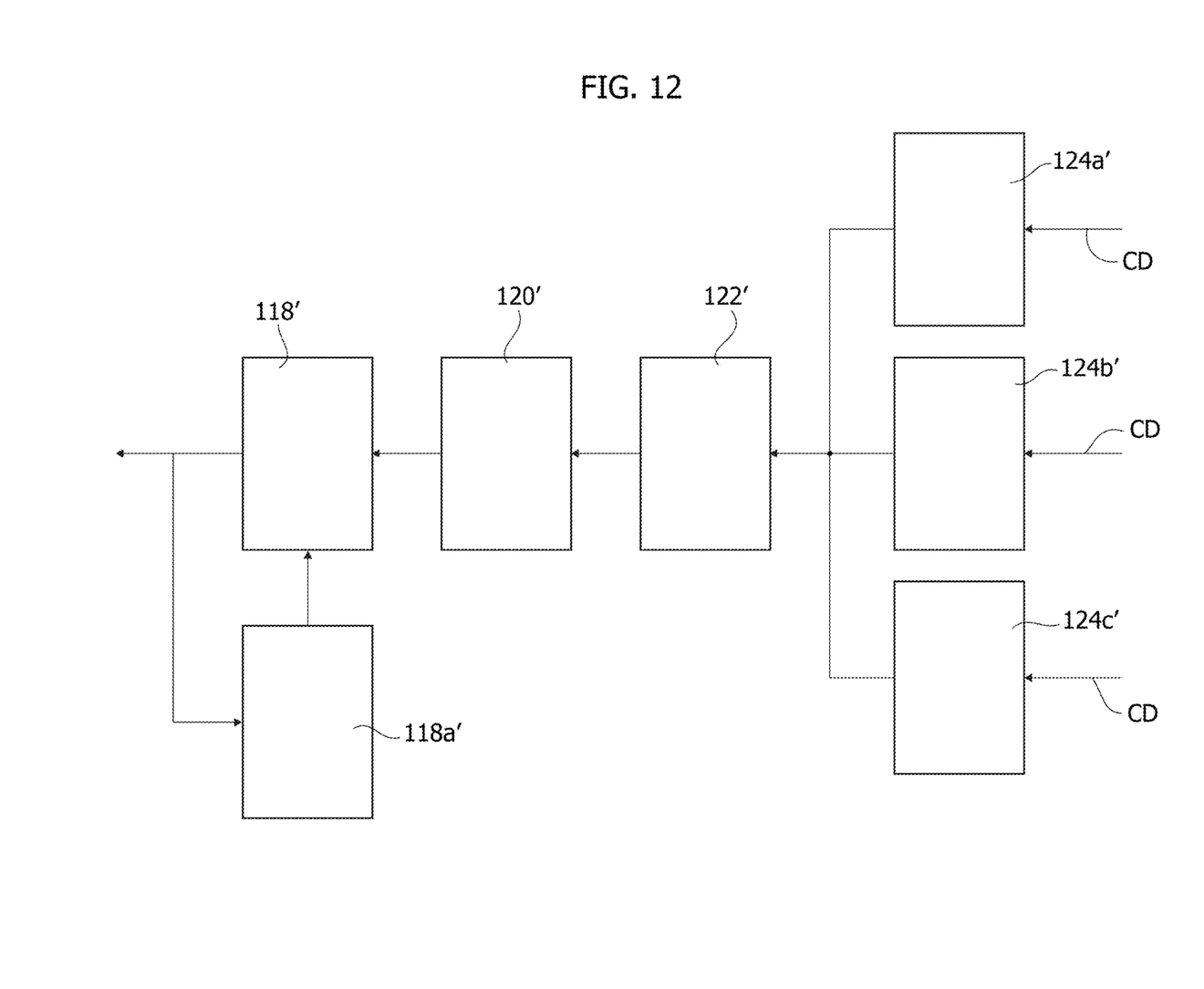
FIGS. 12 and 13 illustrate an example of embodiment of an encoder.
Figure 13:
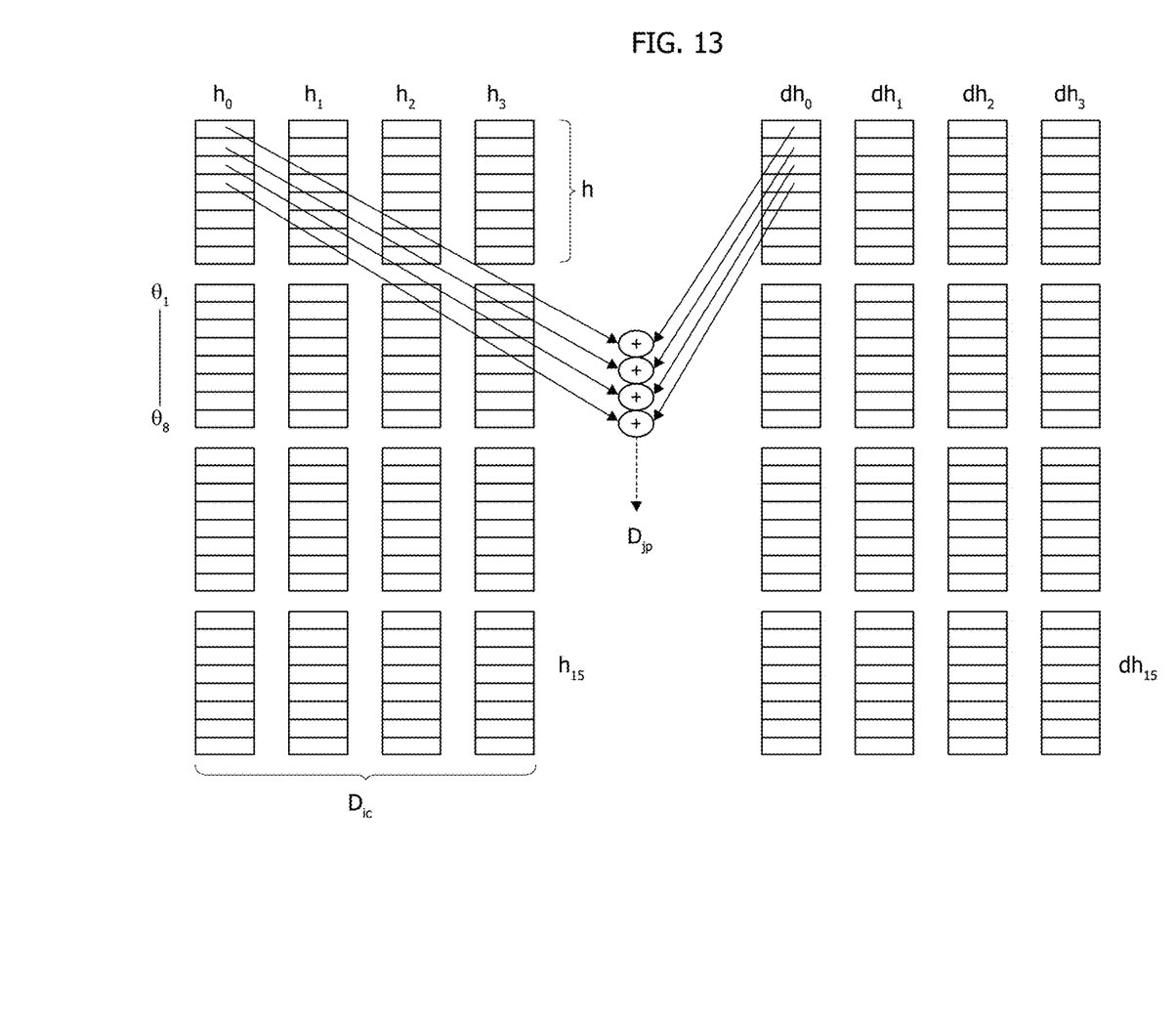

Again, various embodiments may envisage the use in parallel of two or more modules 124a, 124b and 124c that are able to execute in a simultaneous or substantially simultaneous way encodings of a different type so as to give rise to redundancy in order to increase the degree of reliability of the encoding operation (and of the corresponding decoding operation that is to be exemplified in what follows with reference to FIGS. 12 and 13).

In various embodiments, the module 124a may be configured for implementing a Huffman encoding. Huffman encoding is a procedure of lossless compression with which it is possible to represent the values of encoded signal that recur most frequently with a lower number of bits, read from a memory, for example, from a look-up table (LUT), whilst the number of bits used for the encoding increases for the less frequent symbols. The frequencies of occurrence can be estimated via a learning step, e.g., off-line, where the encoder learns the probability distribution associated to the symbols and accordingly fills the memory locations (for example, the LUT) used for the encoding.

In various embodiments, the module 124b may be configured for implementing an arithmetical encoding. Underlying the arithmetical encoding is once again the principle of representing the most frequent values with a lower number of bits, whilst the number of bits used for encoding increases for the less frequent symbols. Underlying the arithmetical encoding is the consideration of the fact that the probability of occurrence of each symbol falls within the interval [0, 1) and that the sum of all the probabilities is equal to 1. The interval in question contains an infinite number of real numbers, so that it is possible to encode any sequence via a number comprised between [0, 1). Once again, the frequencies of recurrence of the symbols can be estimated in a learning step, e.g., off-line, where the probability distribution associated to the symbols is determined. In various forms of arithmetical encoding it is possible to do without a specific learning step, resorting to an adaptive version of the procedure in which the procedure starts by considering all the symbols that have the same frequency and then updates its knowledge regarding the frequencies whenever a symbol is encoded (or decoded).

In various embodiments, the module 124c may be configured for implementing Type Coding (TC), i.e., a technique of vector quantization in which to an m-dimensional symbol s it is possible to associate the closest element q on a regular m-dimensional lattice. In this way, instead of s the index associated to q is transmitted. The main benefit lies in the fact that the structure of the lattice is independent of the data so that type coding does not require creation and transmission of any code or codebook. Type coding TC is based upon two parameters: m, namely the number of elements in each symbol, and n, used for controlling the number of elements constituting the lattice. The parameter m is a divisor of the total length of the descriptor.

As already mentioned, the representation of FIGS. 12 and 13 illustrates possible examples of embodiment of a procedure/system that is able to decode the compressed descriptors CD generated according to the modalities exemplified previously.

In the diagram of FIG. 12, the references 124a', 124b' and 124c' identify modules that are able to execute on the compressed descriptors CD actions of decoding complementary to the actions of encoding implemented in the modules 124a, 124b and 124c of FIG. 11, i.e., a Huffman decoding (module 124a'), an arithmetical decoding (for example, adaptive decoding-module 124b') and/or a type decoding (module 124c').

In various embodiments, for the modules 124a', 124b' and/or 124c' there may apply what has been said previously in relation to the modules 124a, 124b and/or 124c.

The fact that the blocks or modules 124a', 124b' and 124c' are represented as ideally located in parallel should hence not be interpreted in the sense of a necessary and imperative simultaneous presence of a number of decoding modules 124a', 124b' and 124c'.

In various embodiments, there may be present just one of the modules 124a', 124b' and 124c', the choice being dictated at the design level by the applications envisaged.

Various embodiments may envisage the presence of two or more modules chosen from among the modules 124a', 124b' and 124c' with the consequent possibility of choosing one or the other of the modules in question as a function of the specific application currently being implemented.

Again, various embodiments may envisage the use in parallel of two or more modules 124a', 124b' and 124c' that are able to execute simultaneously or substantially simultaneously decodings of a different type so as to give rise to redundancy in order to increase the degree of reliability of the decoding operation.

Whatever the solution adopted, at output from the module or modules in question information is present that can be fed to a run-length (de)coding module 122' operating according to modalities complementary to those of the module 122 that has been seen previously.

For example, in various embodiments, run-length decoding (that is reverse run-length encoding) may be used for expanding a bicomponent vector into a number equal to "run" that follows (or possibly precedes) a number of zeros equal to "length".

The signal resulting from run-length decoding is fed to a module 120 that performs a reverse scalar quantization according to the equation $$p_i'=1/(2^b-1)\cdot q_i$$

already recalled previously.

Optionally, the signal resulting from the run-length decoding may be fed to a module 120 that performs a vector quantization, which is used for addressing one or more dictionaries that is/are a copy of the ones used on the vector-encoder side. At said address/addresses hence the word/words to be sent to the subsequent module, possibly added in the case of use of a number of dictionaries, is/are read.

In various embodiments, a subsequent module 118' may then perform a function of accumulation (as a function of a delay defined in a block 18a) so as to re-create the quantities $\theta_j$ of $dh_i$ (i.e., the histogram differences that represent $D_{jp}$ and $D_{ic}$ according to the modalities schematically represented in FIG. 13).

In this way (i.e., by operating substantially in a way complementary to that of module 14 of FIG. 9), it is possible to "re-obtain" values of the descriptors of both of the frames, i.e., $D_{ic}$ and $D_{jp}$ (the latter reconstructed starting from $D_{ic}$ and from the histogram differences).

The availability of the descriptors, with storage of the information regarding the keypoints to which they refer (which can be implemented, for example, via the co-ordinates encoded by the block 20 of FIG. 3) enables reconstruction (according to any technique known for this purpose) of a version or (approximate) replica of the descriptors of the starting frame.

Of course, without prejudice to the principle of the invention, the details of construction and the embodiments may vary, even significantly, with respect to what is illustrated herein purely by way of non-limiting example, without thereby departing from the extent of protection. Said extent of protection is defined by the annexed claims.

What is claimed is:

1. A method of encoding a first and a second video frame in a flow of digital video frames, the method including:
   extracting for said first and second frame respective sets of points of interest and descriptors wherein each descriptor includes a plurality of orientation histograms relative to a patch of pixels centered on the respective point of interest,
   identifying a pair of linked descriptors, one for the first frame and the other for the second frame, having a minimum distance out of the distances of any of the descriptors for the first frame and any of the descriptors for the second frame,
   calculating the differences of the histograms of the descriptors linked in said pair, and
   encoding the descriptors linked in said pair as a set including one of the descriptors linked in said pair and said histogram differences, wherein said histogram differences are subjected, after thresholding by setting to zero all the differences below a certain threshold, to quantization and to run-length encoding.

2. The method of claim 1, wherein said run-length encoding is followed by further encoding selected out of Huffman coding, arithmetic coding and type encoding.

3. The method of claim 1, including, prior to calculating said histogram differences, projecting to a common coordinate system the histograms of the descriptors linked in said pair.

4. The method of claim 1, including:
   identifying, in addition to said pair of linked descriptors having a minimum distance out of the distances of any of the descriptors for the first frame and any of the descriptors for the second frame, a second pair of linked descriptors having a distance which differs from said minimum distance by less than a threshold difference, and
   encoding both said pair of linked descriptors and said second pair as an encoded pair.

5. A method of decoding a first and a second video frame, the method including:
   recovering histogram differences of a pair of linked descriptors, one for the first frame and one for the second frame having a minimum distance out of distances of any descriptors for the first frame and any descriptors for the second frame, encoded as a set including one of the linked descriptors and the histogram differences and subjected to quantization and run-length coding,
   subjecting said recovered histogram differences to inverse run-length coding to produce two-component entities including a non-zero number RUN followed or preceded by number of zeros equal to LENGTH,
   subjecting said two-component entities to inverse quantization,
   generating, from said one of the descriptors linked in said pair and said two-component entities subjected to inverse quantization, a replica of the other of the descriptors linked in said pair.

6. The method of claim 5, wherein said recovering said run-length encoded differences includes a decoding operation selected out of Huffman decoding, arithmetic decoding and type decoding.

7. An apparatus, comprising:
   a memory; and
   digital image processing circuitry coupled to the memory, wherein the digital image processing circuitry, in operation,
   extracts from a first frame and from a second frame of a digital video sequence respective sets of points of interest and descriptors, wherein each descriptor includes a plurality of orientation histograms relative to a patch of pixels centered on the respective point of interest;
   identifies a pair of linked descriptors, one for the first frame and the other for the second frame, having a minimum distance out of the distances of any of the descriptors for the first frame and any of the descriptors for the second frame;
   calculates the differences of the histograms of the descriptors linked in said pair; and
   encodes the descriptors linked in said pair as a set including one of the descriptors linked in said pair and said histogram differences, wherein said histogram differences are subjected, after thresholding by setting to zero all the differences below a certain threshold, to quantization and to run-length encoding.

8. The apparatus of claim 7 wherein the digital image processing circuitry, in operation, applies one of Huffman coding, arithmetic coding and type encoding after the run-length encoding.

9. The apparatus of claim 7 wherein the digital image processing circuitry, in operation, projects to a common coordinate system the histograms of the descriptors linked in said pair, prior to calculating the histogram differences.

10. The apparatus of claim 7 wherein the digital image processing circuitry, in operation,
    identifies a second pair of linked descriptors having a distance which differs from said minimum distance by less than a threshold difference; and
    encodes both said pair of linked descriptors and said second pair of linked descriptors as an encoded pair.

11. An apparatus, comprising:
    a memory; and
    digital image processing circuitry coupled to the memory, wherein the digital image processing circuitry, in operation,
    recovers histogram differences of a pair of linked descriptors, one of a first frame and one of a second frame of an encoded video sequence having a minimum distance out of distances of any descriptors of the first frame from any descriptors of the second frame, encoded as a set including one of the linked descriptors and the histogram differences and subjected to quantization and run-length coding;
    subjects said recovered histogram differences to inverse run-length coding to produce two-component entities including a non-zero number followed or preceded by number of zeros;
    subjects said two-component entities to inverse quantization; and
    generates, from the one of the descriptors linked in said pair and said two-component entities subjected to inverse quantization, a replica of the other of the descriptors linked in said pair.

12. The apparatus of claim 11 wherein the decoding circuitry, in operation, performs a decoding operation selected out of Huffman decoding, arithmetic decoding and type decoding.

13. A non-transitory computer-readable medium having contents which, when executed by digital image processing circuitry, cause the digital image processing circuitry to perform a method, the method comprising:
   extracting, from a first frame and from a second frame of a digital video sequence, respective sets of points of interest and descriptors, wherein each descriptor includes a plurality of orientation histograms relative to a patch of pixels centered on the respective point of interest;
   identifying a pair of linked descriptors, one for the first frame and the other for the second frame, having a minimum distance out of the distances of any of the descriptors for the first frame and any of the descriptors for the second frame;
   calculating the differences of the histograms of the descriptors linked in said pair; and
   encoding the descriptors linked in said pair as a set including one of the descriptors linked in said pair and said histogram differences, wherein said histogram differences are subjected, after thresholding by setting to zero all the differences below a certain threshold, to quantization and to run-length encoding.

14. The medium of claim 13 wherein the method includes applying one of Huffman coding, arithmetic coding and type encoding after the run-length encoding.

15. The medium of claim 13 wherein the method includes projecting to a common coordinate system the histograms of the descriptors linked in said pair, prior to calculating the histogram differences.

16. The medium of claim 13 wherein the method includes:
   identifying a second pair of linked descriptors having a distance which differs from said minimum distance by less than a threshold difference; and
   encoding both said pair of linked descriptors and said second pair of linked descriptors as an encoded pair.

17. A non-transitory computer-readable medium having contents which, when executed by digital image processing circuitry, cause the digital image processing circuitry to perform a method of decoding an encoded video sequence, the method comprising:
   recovering histogram differences of a pair of linked descriptors, one of a first frame and one of a second frame of the encoded video sequence having a minimum distance out of distances of any descriptors of the first frame from any descriptors of the second frame, encoded as a set including one of the linked descriptors and the histogram differences, and subjected to quantization and run-length coding;
   subjecting said recovered histogram differences to inverse run-length coding to produce two-component entities including a non-zero number followed or preceded by number of zeros;
   subjecting said two-component entities to inverse quantization; and
   generating, from the one of the descriptors linked in said pair and said two-component entities subjected to inverse quantization, a replica of the other of the descriptors linked in said pair.

18. The medium of claim 17 wherein the method includes performs a decoding operation selected out of Huffman decoding, arithmetic decoding and type decoding.

19. The medium of claim 17 wherein the contents when executed by digital image processing circuitry, cause the digital image processing circuitry to encode the encoded video sequence by:
   extracting, from the first frame and from the second frame of the digital video sequence, respective sets of points of interest and descriptors, wherein each descriptor includes a plurality of orientation histograms relative to a patch of pixels centered on the respective point of interest;
   identifying the pair of linked descriptors;
   calculating the differences of the histograms of the descriptors linked in said pair; and
   encoding the descriptors linked in said pair as a set including one of the descriptors linked in said pair and said histogram differences, wherein said histogram differences are subjected, after thresholding by setting to zero all the differences below a certain threshold, to quantization and to run-length encoding.

* * * * *